United States Patent
Brunette, Jr. et al.

(10) Patent No.: US 7,650,501 B1
(45) Date of Patent: Jan. 19, 2010

(54) SYSTEM AND METHODS FOR CONSTRUCTION, FUSION, PROSECUTION, AND MAINTENANCE OF MINIMIZED OPERATING ENVIRONMENTS

(75) Inventors: Glenn M. Brunette, Jr., Medford Lakes, NJ (US); David Walker, Hampshire (GB); Bart Blanquart, Mechelen (BE)

(73) Assignee: Sun Microsystems, Inc., Santa Clara, CA (US)

( * ) Notice: Subject to any disclaimer, the term of this patent is extended or adjusted under 35 U.S.C. 154(b) by 824 days.

(21) Appl. No.: 11/059,140

(22) Filed: Feb. 15, 2005

(51) Int. Cl.
 *H04L 29/02* (2006.01)
(52) U.S. Cl. .................. 713/165; 713/166; 713/167
(58) Field of Classification Search ......... 713/165–167; 717/110–112, 120–121, 151, 155, 169–170, 717/175–178
See application file for complete search history.

(56) References Cited

U.S. PATENT DOCUMENTS

| | | | |
|---|---|---|---|
| 4,984,272 A * | 1/1991 | McIlroy et al. ................. | 726/17 |
| 5,796,825 A * | 8/1998 | McDonnal et al. ........... | 713/165 |
| 2003/0149895 A1* | 8/2003 | Choo et al. .................. | 713/201 |
| 2004/0177356 A1* | 9/2004 | Westendorf et al. ......... | 717/175 |
| 2004/0216090 A1* | 10/2004 | Kaler et al. .................. | 717/121 |

OTHER PUBLICATIONS

Noordergraaf, Alex et al."JumpStart Architecture and Security Scripts for Solaris Operating Environment- Part 3" Sin BluePrints Online Nov. 2000:1-33.*

* cited by examiner

*Primary Examiner*—Jung Kim
*Assistant Examiner*—Venkat Perungavoor
(74) *Attorney, Agent, or Firm*—Martine Penilla & Gencarella, LLP

(57) ABSTRACT

Several methods are provided for applying minimization to computer systems. A unified security profile is created and applied to a computer system. This provides a listing of software packages required to be installed on the computer system. Extraneous files not associated with a required software package are identified. In one method, a software module interposes between calls to filesystem operations and the filesystem. This module allows or denies access to files based on a configuration information source (which is itself based on the unified security profile), the zone from which the access request originates, and the privileges of the user making the request. Reference to each file minimized is removed from the computer system's package manifest. Files thus minimized are neither visible nor accessible to unauthorized entities on the computer system. If the unified security profile of the system is required to change, minimization actions can therefore be reversed.

12 Claims, 8 Drawing Sheets

SYSTEM AND METHODS FOR CONSTRUCTION, FUSION, PROSECUTION, AND MAINTENANCE OF MINIMIZED OPERATING ENVIRONMENTS

CROSS REFERENCE TO RELATED APPLICATIONS

This application is related to U.S. patent application Ser. No. 10/837,063, filed on Apr. 30, 2004, and entitled "Methods and Systems for Securing a System in an Adaptive Computer Environment." The disclosure of this related application is incorporated herein by reference.

BACKGROUND

Today, the security of an organization's computer network assets is often based on a manual review and configuration of a variety of parameters, wherein the sum of these parameters constitutes a security profile for the corresponding site, environment, or application. The security profile can include information pertaining to minimization of a computer system's software, wherein minimization serves to constrain the software available on the computer system to be a set of software explicitly required for the computer system to perform its business function and be managed.

If it is determined that a service is not required for a computer system to perform its business functions and be managed, there is no virtue in the application binaries, libraries, and configuration files associated with the unnecessary service being included as part of the software distribution visible on the computer system. In fact, there is virtue in having files associated with the unnecessary service unavailable on the computer system. In a situation where an unnecessary file, such as a mail server executable deployed on a computer system functioning as a web server, includes a vulnerability which would allow an authorized user of the computer system to elevate their privilege in an unauthorized manner once logged in, removal of the unnecessary file is a genuine security enhancement. Minimization is a process for removing files and packages associated with unnecessary services from a computer system.

As computer systems, networks, and applications become more mobile and versatile, an increasing need exists for improvements in minimization technology and associated deployment for contributing to the security of the computer systems.

SUMMARY

It should be appreciated that the present invention can be implemented in numerous ways, such as a process, an apparatus, a system, a device or a method on a computer readable medium. Several inventive embodiments of the present invention are described below.

In one embodiment, a method for applying minimization to a label-aware computer system is disclosed. The method includes creating a minimization compartment on the computer system, wherein the minimization compartment has an associated minimization label. The method also includes obtaining a unified security profile. The unified security profile provides a listing of software packages authorized to be installed on the computer system. The method further includes identifying extraneous files on the computer system. An extraneous file is a file that is not associated with at least one software package listed within the unified security profile. Each identified extraneous file has its label rewritten to the minimization label, whereby the minimization label causes the associated file to be included in the minimization compartment. The method further includes removing reference to each identified extraneous file from a user-visible package manifest of the computer system, wherein the user-visible package manifest of the computer system provides a listing of packages and files installed on the computer system.

In another embodiment, a method for maintaining a computer system having a minimized state is disclosed. The minimized state corresponds to a minimal operation of software on the computer system such that extraneous software present on the computer system is neither visible nor accessible on the computer system. The method includes an operation for changing the computer system into an unminimized state in which both required software and extraneous software present on the computer system is visible and accessible. The method also includes an operation for performing maintenance operations on the computer system while in the unminimized state. The method further includes an operation for changing the computer system from the unminimized state into the minimized state to cause extraneous software present on the computer system to once again be neither visible nor accessible on the computer system.

In another embodiment, a method for implementing a minimization strategy within a computer system is disclosed. In the method, a file access call is intercepted in transit from an application layer to a disk interface layer. The application layer and the disk interface layer represent portions of an operating system architecture of the computer system. A determination is then made to resolve whether a file associated with the intercepted file access call is required to be present on the computer system based on a minimization configuration information source, such as a file, an entry in a directory, or some other entity. The minimization configuration information source provides a listing of software packages and associated files that are required to be installed and visible on the computer system. If the file associated with the intercepted file access call is required to be present on the computer system, the method allows the intercepted file access call to proceed to the disk interface layer. However, if the file associated with the intercepted file access call is not required to be present on the computer system, the method prevents the intercepted file access call from proceeding to the disk interface layer.

In another embodiment, a method for implementing a minimization strategy within a computer system is disclosed. The method includes an operation for installing a minimal operating system on the computer system. The method also includes an operation for establishing a repository of software available for installation on the computer system. The repository of software can be established either on the computer system or on a remote computer system. The method further includes an operation for receiving a system call to access an object associated with in a particular software package. A determination is then made to resolve whether the object associated with the particular software package is installed on the computer system. If the object associated with the particular software package is installed on the computer system, the system call is processed. If the object associated with the particular software package is not installed on the computer system, the method includes operations for installing the particular software package from the repository and processing the system call.

Other aspects of the invention will become apparent from the following detailed description, taken in conjunction with the accompanying drawings, illustrating by way of example the principles of the invention.

DETAILED DESCRIPTION

Figure 1:
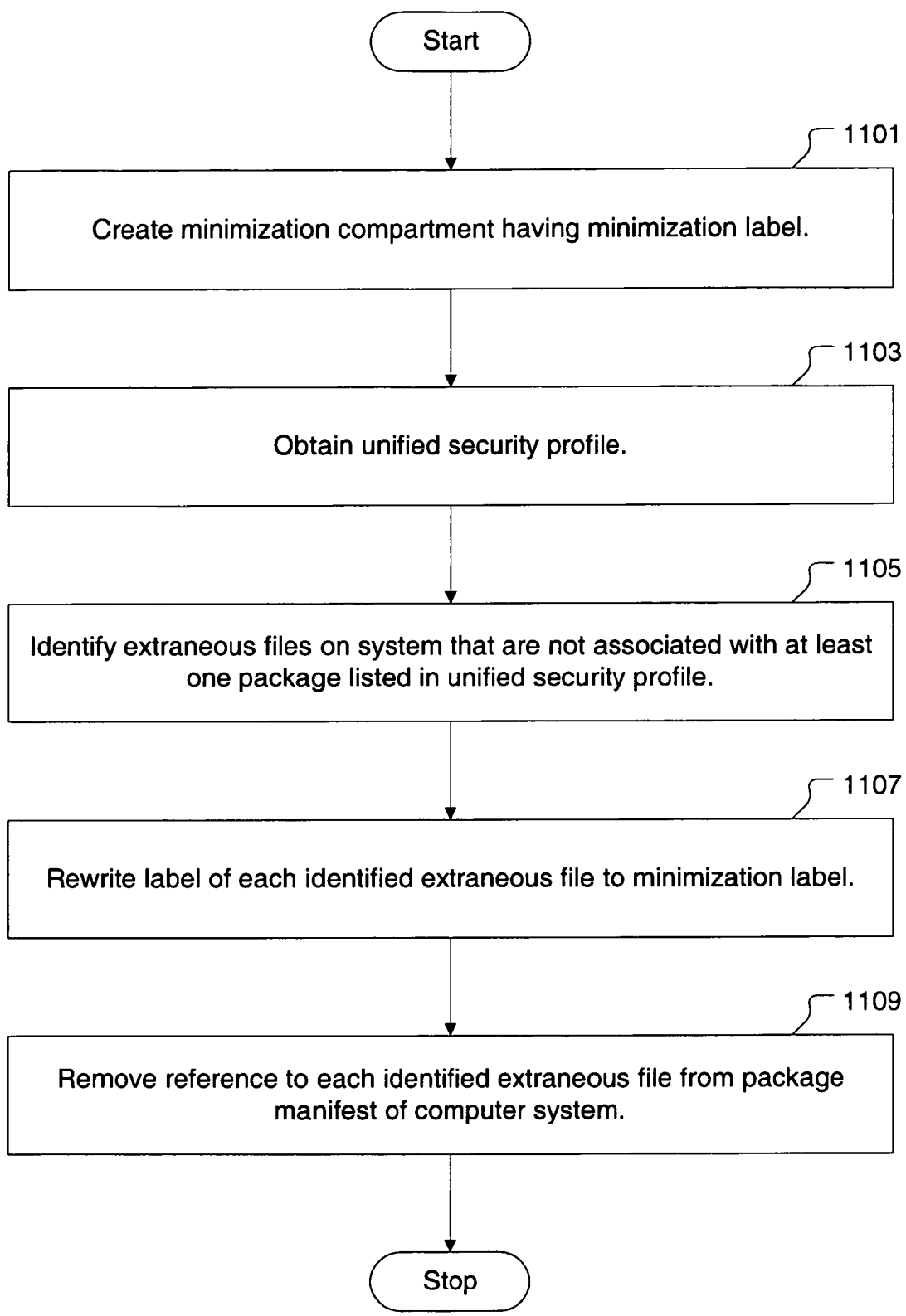
FIG. 1 is an illustration showing a flowchart of a method for applying minimization to a label-aware computer system, in accordance with one embodiment of the present invention.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

It should be appreciated that the present invention can be implemented in numerous ways, including as a process, an apparatus, a system, a device, or a method. Several exemplary embodiments of the invention will now be described in detail with reference to the accompanying drawings.

The present invention provides a system and method for improving the overall security of computer systems, devices, and applications, particularly in adaptive, dynamic, and consolidated computing environments. The present invention also serves to ensure supportability and serviceability of the computer systems, devices, and applications. In one embodiment, the present invention provides for automation of a minimization process, wherein the minimization process involves functional removal of software packages from an installed distribution to enhance security. In another embodiment, the present invention provides computer system lifecycle services such as applying a new or updated security profile and undoing a previous application of a security profile. In another embodiment, the present invention provides a flexible, pluggable interface to create customized software configurations based on individual customer or site requirements.

If it is determined that a service is not required for a computer system to perform its business functions and be managed, then there is no virtue in the application binaries and configuration files associated with the unnecessary service being included as part of the software distribution visible on the computer system. In fact, there is virtue in having such files explicitly unavailable on the computer system. In a situation where an unnecessary file, such as a particular shared library, contains a vulnerability which would allow an authorized user of the host with an appropriate subset of available privileges to elevate their privileges in an unauthorized manner once logged in, the removal of the unnecessary file is a genuine security enhancement. Minimization is a process for removing files or software packages associated with unnecessary services from a computer system.

Traditional minimization of a computer system is a manual, static process. Also, traditional minimization is an irreversible process in which removal or deactivation of software packages is performed by deleting the software packages from the computer system. Thus, recovery from the traditional minimization process requires performance of an associated software re-installation process.

Over the lifecycle of a computer system, particularly in a dynamic environment, minimization can produce complications as a result of files/packages having been minimized from the computer system falling out of synchronization with patching regimes. Re-applying patches dating from the release of the packages having been minimized from the system, and rationalizing partial failures in previous patching processes which were potentially deploying previous iterations of patches, can be an exceedingly complex activity which, if performed manually, is extremely likely to result in error, system inconsistency, or denial of vendor support.

The present invention enables minimization to be considered on a per-application basis, thus providing considerable flexibility in the face of requirements for service deployment, re-deployment, or upgrade. The present invention also makes minimization reversible to facilitate maintenance, patching, and support and to make re-minimization after maintenance, patching, and support straightforward. Reversible minimization is facilitated by retaining on the system all files/packages having been minimized from the system, rather than expunging the files/packages. The continued presence throughout the system's lifecycle of all files associated with the operating environment ensures that during maintenance, consistency of patch levels across all facilities can be maintained. Several methods for minimizing a computer system are described below.

It should be appreciated by those skilled in the art that Mandatory Access Control (MAC) capable operating environments are able to support multiple segregated compartments, wherein the support includes an assignment of labels to entities such as files, devices, and users. An example of a MAC-capable operating environment is "Trusted Solaris™" produced by Sun Microsystems, Inc. For discussion purposes, a computer system incorporating a multi-compartment MAC-capable operating environment is referred to as a label-aware computer system. A set of rules regarding how labeled entities can interact with each other is held in a configuration information source on the label-aware computer system. The configuration information source can be made immutable to users of the computer system through use of MAC mechanisms present in the MAC-capable operating environment. For example, in the case of Trusted Solaris™, the configuration information source is resident as "/etc/security/tsol/label_encodings." The labels are defined by a classification and a compartment. The classification indicates level of security, i.e., a degree of security. For example, in one embodiment, a particular classification can be selected from a hierarchy including levels "TOP SECRET," "SECRET," "CONFIDENTIAL," etc. In another embodiment, the classification can be selected from a hierarchy including levels "PUBLIC," "INTERNAL," "NEED TO KNOW," etc. In yet another embodiment, the classifications can be disjoint, i.e., non-hierarchical. The compartment represents a grouping of entities. The compartment can also be considered a container for entities that share some relationship.

Relationships between labeled entities can be hierarchical and/or compartmentalized. In a hierarchical relationship, a label that dominates another label is able to read data from the dominated label, i.e., lower-sensitivity label. Additionally, a label can be used to indicate a level of clearance assigned to an entity. The level of clearance assigned to an entity defines a highest level of access assigned to the entity. For example, if the entity is a user, the user cannot read or write data above its clearance level. It should be understood, however, that an entity can be granted temporary privilege to exceed its assigned clearance. Also, processes can be given specific privileges to enable them to bypass label restrictions.

FIG. 1 is an illustration showing a flowchart of a method for applying minimization to a label-aware computer system, in accordance with one embodiment of the present invention. The method of FIG. 1 begins with a newly-built, unminimized, label-aware computer system ("system" for discussion purposes). The method includes an operation 1101 for creating on the system a minimization compartment having a minimization label. The minimization label is established such that the minimization compartment is disjoint from all other containers defined on the system. For example, in one embodiment, a minimization compartment labeled "TOP SECRET MINIMIZED" is created. The only entity allowed to access data labeled as "TOP SECRET MINIMIZED" is an agent that has been given privilege to exceed its label clearance for reads and writes, including a privilege to rewrite existing labels of entities. The agent in the context of its environment can be considered as a reference monitor for handling the minimization process.

In an operation 1103, a unified security profile is obtained by the agent. The unified security profile represents a synthesis of a minimization profile, wherein the unified security profile provides a list of packages that are authorized to be active on the system. An operation 1105 is then performed to identify extraneous files on the system that are not associated with at least one package listed in the unified security profile. In an operation 1107, each file identified as being extraneous has its label rewritten to the minimization label. For example, if the minimization compartment is labeled "TOP SECRET MINIMIZED," each file identified as being extraneous has its label rewritten to "TOP SECRET MINIMIZED." Then in an operation 1109, any reference to each file having its label rewritten to "TOP SECRET MINIMIZED" is removed from a package manifest of the system, wherein the package manifest of the system details all software installed on the system.

The files rewritten to the "TOP SECRET MINIMIZED" label appear to not be present on the system, except to entities having "TOP SECRET MINIMIZED" clearance. However, the files rewritten to the "TOP SECRET MINIMIZED" label are retained on the system. Any entity, e.g., software or user, having a clearance less than "TOP SECRET MINIMIZED" will not be able to access files that have been rewritten to the "TOP SECRET MINIMIZED" label. Therefore, in accordance with the foregoing, the method of FIG. 1 uses label segregation to implement the minimization process on the system.

Figure 2:
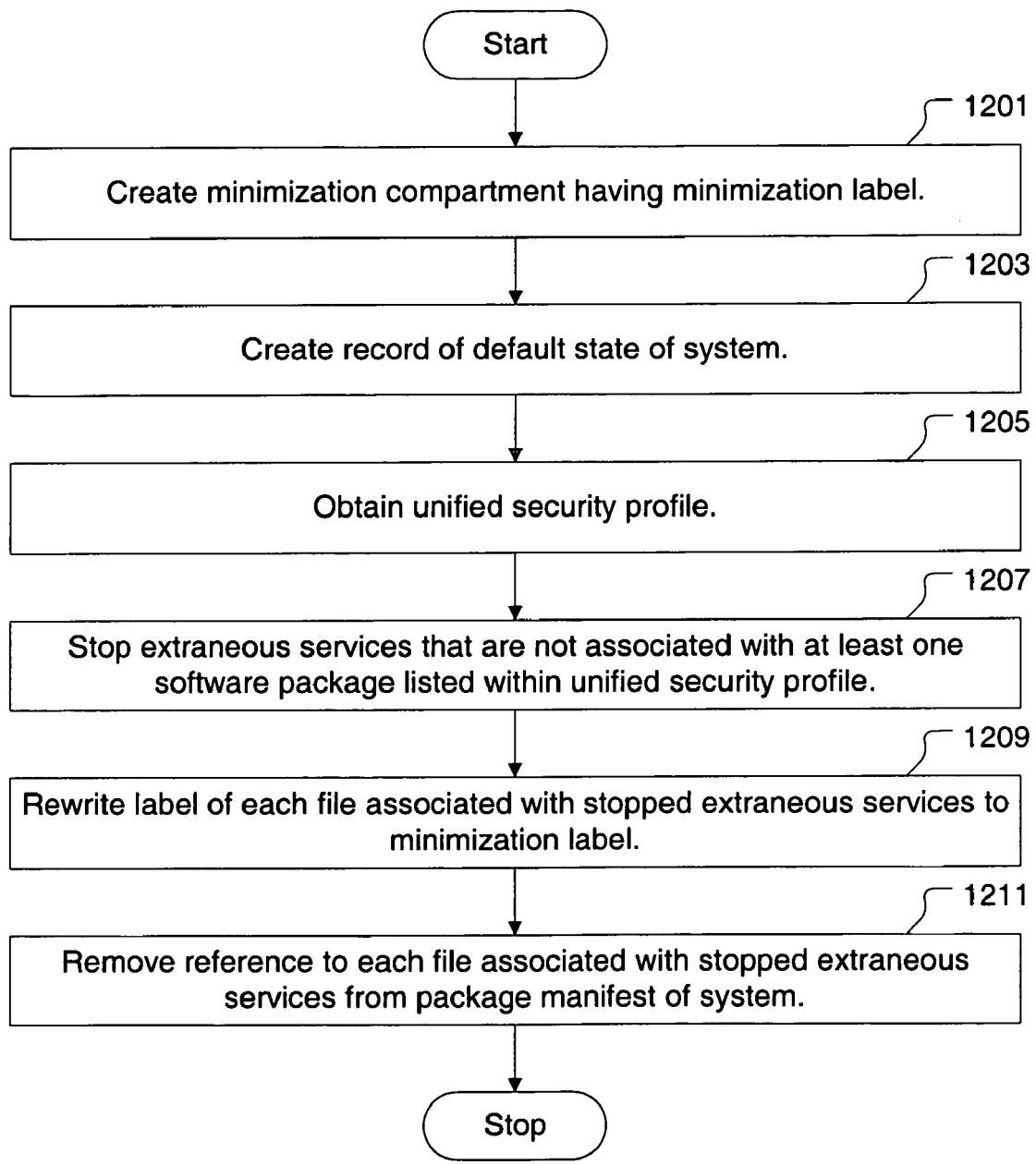
FIG. 2 is an illustration showing a flowchart of a method for implementing minimization within a label-aware computer system, in accordance with another embodiment of the present invention.

FIG. 2 is an illustration showing a flowchart of a method for implementing minimization within a label-aware computer system, in accordance with another embodiment of the present invention. The method of FIG. 2 begins with a newly-built, unminimized, label-aware computer system ("system" for discussion purposes). The method includes an operation 1201 for creating on the system a minimization compartment having a minimization label. The minimization label is established such that the minimization compartment is disjoint from all other containers defined on the system. In an operation 1203, a record of a default state of the system is created. In one embodiment, the record of the default state of the system is created by placing a copy of the system's original package manifest in a private directory under the minimization label. It should be appreciated that the reads and writes to the minimization label are conducted by a management agent that has been given rights to exceed its label privileges. Furthermore, creating the record of the default state of the system also includes extending the copy of the system's original package manifest under the minimization label to include the default label for each file listed in the package manifest. The original label of each file in the package manifest can be used later during a process to reverse the minimization of the system.

In an operation 1205, a unified security profile is obtained. The unified security profile provides a listing of packages that are to be provisioned on the system. An operation 1207 is then performed to stop extraneous services from operating on the system, wherein the extraneous services are not associated with at least one package listed in the unified security profile. The operation 1207 includes determining package associations and resolving package dependencies. In the case of Trusted Solaris™, services deemed extraneous can be stopped using calls to scripts in "/etc/init.d."

In an operation 1209, each file associated with a stopped extraneous service has its label rewritten to the minimization label. Then, in an operation 1211, reference to each file associated with a stopped extraneous service is removed from the visible package manifest of the system. In the case of Trusted Solaris™, the package manifest resides at "/var/sadm/install/contents." Therefore, from a perspective of a service operating on the system with a label disjoint from the minimization compartment, each file associated with a stopped extraneous service appears to be removed from the system, though still physically present within the filesystem.

Figure 3:
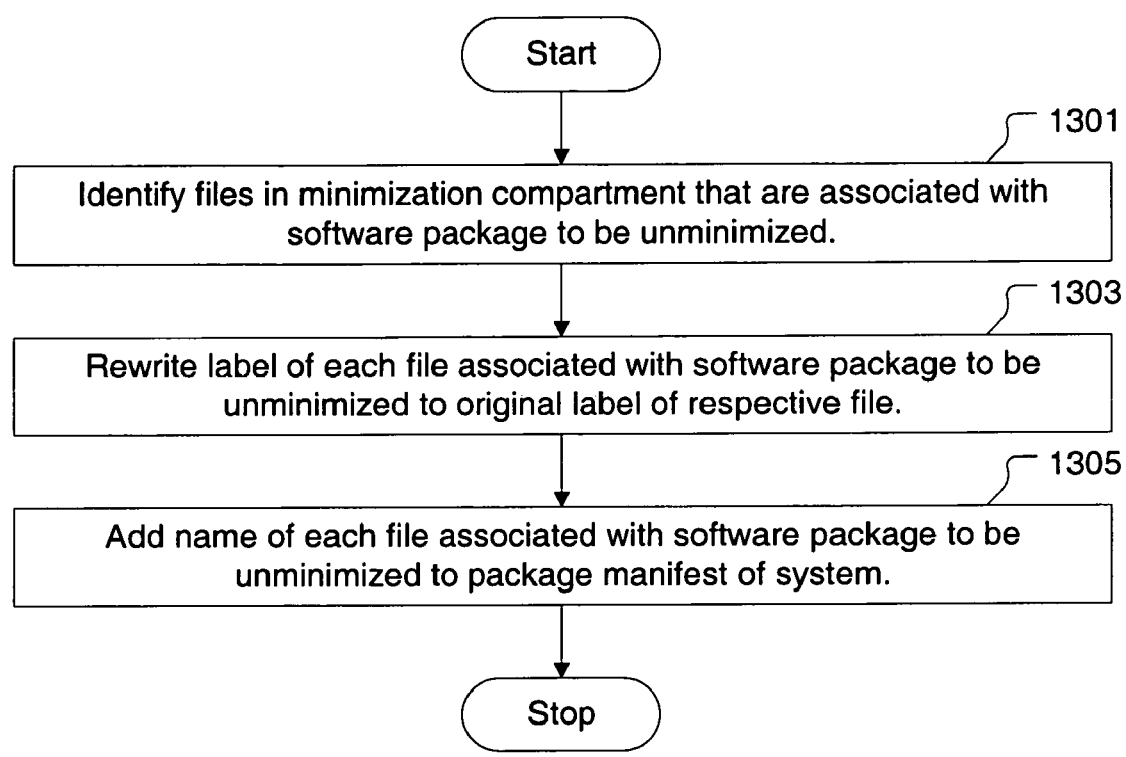
FIG. 3 is an illustration showing a flowchart of a method for unminimizing a software package in a label-aware, minimized system, in accordance with one embodiment of the present invention.

FIG. 3 is an illustration showing a flowchart of a method for unminimizing a software package in a label-aware, minimized system, in accordance with one embodiment of the present invention. The method of FIG. 3 is premised on the consideration that a request has been made to install a software package on the system. The method includes an operation 1301 for identifying files associated with the software package in a minimization compartment on the system, thus indicating that the software package had been previously minimized. In an operation 1303, a label of each file associated with the software package to be unminimized is rewritten to its original label. In one embodiment, the original label of each file associated with the software package to be unminimized is obtained from a package manifest present in the minimization compartment. An operation 1305 is then performed to add the name of each file associated with the software package to be unminimized to a package manifest of the system, wherein the package manifest of the system is visible to the system.

Minimization as provided by the present invention does not require physical removal of the software from the system. However, traditional minimization involves physical removal of the software from the system, i.e., deletion of the software from the system. If software is deleted from the system, reinstallation of the software can present problems with respect to patching.

For example, consider that there is generally not a one-to-one correspondence between a patch in a patch bundle and a package. Therefore, it is possible to have a patch that modifies files associated with more than one software package. Consequently, in a traditional minimized environment, if a package is removed from the system and the system is subsequently patched, the removed package is vulnerable to missing a patch. Thereafter, if the removed package is to be reinstalled, the patches applied when the package was not installed need to be rationalized. Rationalization of patches can be a difficult process and prone to error.

The present invention provides for minimization of a system without removal of packages or files. Therefore, when patching or maintenance is required, the system can be temporarily reverted to a completely unminimized state wherein all packages are present and visible to the patching mechanism. Patching can then be performed on the system in the unminimized state. Then, immediately upon completion of the patching, the system can be placed again in the previous minimized state.

Figure 4:
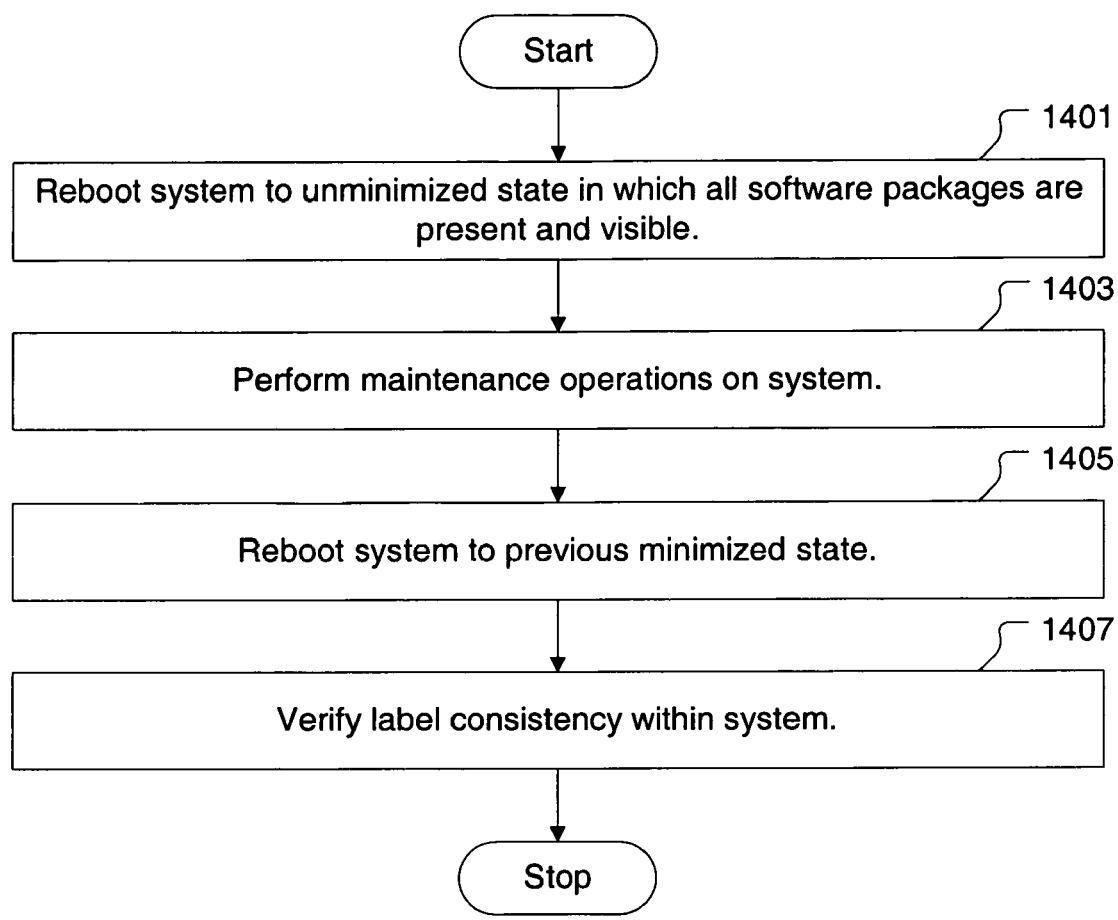
FIG. 4 is an illustration showing a flowchart of a method for maintaining a minimized computer system, in accordance with one embodiment of the present invention.

FIG. 4 is an illustration showing a flowchart of a method for maintaining a minimized computer system, in accordance with one embodiment of the present invention. In an operation 1401, the system is rebooted to an unminimized state in which all software packages are present and visible. In an operation 1403, maintenance operations, e.g., patching operations, are performed on the system. An operation 1405 is then provided in which the system is rebooted to a previous minimized state. An operation 1407 can be optionally performed to verify label consistency within the system following the reboot into the previous minimized state.

In the case of a computer system operating under Trusted Solaris™, label services are only available at runlevels 2 and 3. Therefore, to revert the Trusted Solaris™ system from the minimized state at runlevel 2 to an unminimized state, the system can be rebooted to runlevel 1, i.e., single user mode. At runlevel 1 there is no minimization by label segregation because label services are not available. While at runlevel 1, patching and maintenance can be performed. Then, the system can be rebooted into runlevel 2 at which label services are started, whereby the system is again in the minimized state based on the previously applied label segregation. Label consistency can then be verified.

In conjunction with the minimization method previously discussed with respect to FIGS. 1-4, a profile of the computer system can be assessed by comparing the contents of the minimization compartment against the visible contents of the system. Effectively, a complement exists between the contents visible on the system and what is minimized off of the system. In other words, a file or package should not be both visible on the system and present in the minimization compartment.

Figure 5:
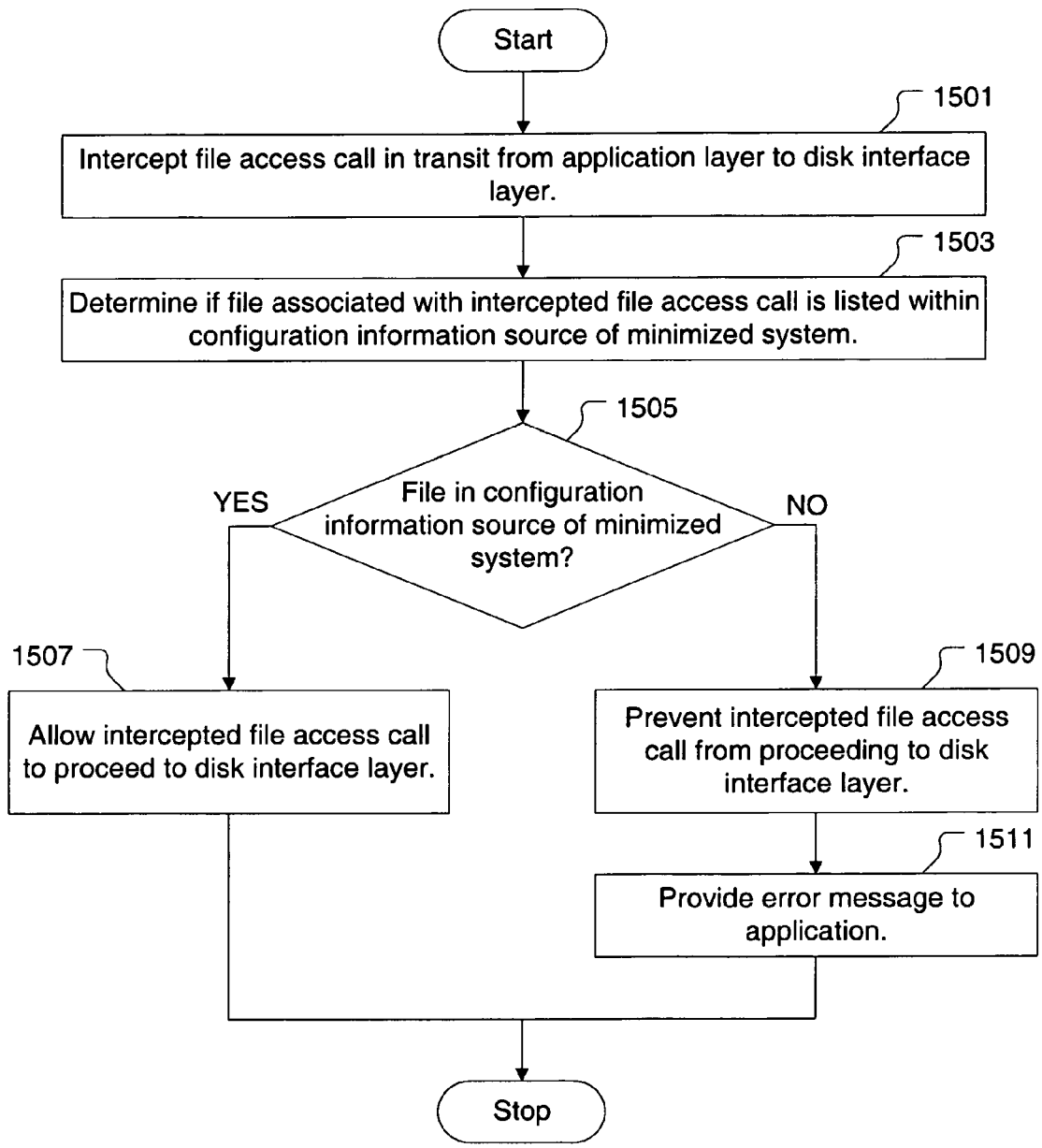
FIG. 5 is an illustration showing a flowchart of a method for implementing minimization within a computer system, in accordance with one embodiment of the present invention.

FIG. 5 is an illustration showing a flowchart of a method for implementing minimization within a computer system, in accordance with one embodiment of the present invention. It should be appreciated that the minimized computer system referenced in conjunction with FIG. 5 can be either label-aware or non-label-aware. For example, in a label-aware embodiment, the computer system can be configured to operate under Trusted Solars™. In an exemplary non-label-aware embodiment, the computer system can be configured to operate under Solars™, also produced by Sun Microsystems, Inc.

The method of FIG. 5 includes an operation 1501 for intercepting a file access call in transit from an application layer of the computer system to a disk interface layer of the computer system. An operation 1503 is then provided for determining if a file associated with the file access call intercepted in the operation 1501 is listed within a configuration information source of the computer system, wherein the configuration information source of the computer system describes the configuration of the computer system in a minimized state. According to an operation 1505, if the file associated with the intercepted file access call is present in the configuration information source of the minimized computer system, the method continues with an operation 1507 in which the file access call is allowed to proceed to the disk interface layer for further processing. However, if the file associated with the intercepted file access call is not present in the configuration information source of the minimized computer system, the method continues from the operation 1505 to an operation 1509. In the operation 1509, the intercepted file access call is prevented from proceeding to the disk interface layer for further processing. Following the operation 1509, the method further includes an operation 1511 for providing an error message to the application from which the intercepted file access call originated. In one embodiment, the error message provided in the operation 1511 simply informs the application that the requested file is not found.

In one embodiment, the method of FIG. 5 can be implemented using a loadable filesystem interposer module ("interposer" hereafter). Consider the computer system as having a software architecture that includes a userspace residing over a kernel space. The userspace includes applications that may be installed and operated on the computer system. The kernel space includes software for interfacing the userspace with low-level system processes. In one embodiment, a filesystem is implemented such that disk-level file system operations are treated as low-level operations. In this embodiment, the interposer can be implemented as a kernel module. Thus, an abstraction layer exists between a part of the kernel space to which an application makes a request to open a file and an actual mechanism at a lower file system level that serves to open the requested file on a disk. The abstraction layer represents an interface between file system calls and corresponding activities performed at disk level. For example, "POSIX" (IEEE, 1986 and subsequent—see http://www.pasc.org/#POSIX) system calls such as "fopen( )," fstat( )," etc., provide an abstraction to what is actually done at "inode" or "vnode" level. Kernel space and user space are also segregated by a privilege mechanism. For example, in one embodiment, specific privileges are required to manipulate objects in kernel space, above privileges required to manipulate objects in user space. However, filesystems are known which exist entirely in user space, and rely on the kernel's security mechanisms to separate the drivers performing low-level operations from other processes. In such a filesystem, the interposer is written in a manner which enables it to be protected by the kernel in the same manner as the low-level drivers.

During operation the interposer receives, i.e., intercepts, file access calls from the application layer. The interposer compares the target file of the file access call to the configuration information source to determine if the target file is allowed to be accessed. If the target file is allowed to be accessed, the interposer functions to allow the file access call to proceed. If the target file is not allowed to be accessed, the interposer functions to either direct the file access call to a configured alternative file, e.g., an empty file, or prevent the file access call from proceeding and return an error message, e.g., "file not found" message, to the file access call initiator. In addition to the interposer functions described above, the interposer can be further defined to update a package manifest file of the computer system to conceal the existence of the target file to which the interposer prevented access. Thus, target files to which the interposer denies access become files minimized from the system.

The interposer may operate in a mode where it performs additional checks, wherein the interposer uses the additional checks to decide whether or not it must disallow access to a file. The interposer can check for a process or user attribute, or for another data point altogether (such as time of day), and only allow access if all conditions are satisfied. In one embodiment, such as the "Solaris 10™" operating environment from Sun Microsystems, Inc., a fine-grained privilege model exists. A specific privilege could be created that would allow access to any file, irregardless of the interposer's configuration. A system maintenance process could be granted that privilege, so that system maintenance would perform as on an unminimized system, while other services would still be restricted with respect to what files can be accessed.

If the interposer is present, it can be desirable to prevent an entity from unloading or disabling the interposer to allow unimpeded access to files on the system. In one embodiment, the interposer can be configured to require authentication of an entity in order to honor a directive to unload or disable the interposer. In one embodiment, the authentication can be provided in the form of a password. The configuration information source could store an authentication token such as a strong hash of the password, as well as the details of the files over which the interposer mediates access. Since the interposer authentication is a property of the interposer itself, rather than a property of the access controls of the computer system, the authentication concept approaches a form of Mandatory Access Control.

In one embodiment, the computer system can be configured to operate in a zone-based operating environment. For example, "Solaris 10™" by Sun Microsystems, Inc. represents a zone-based operating environment. In the zone-based operating environment, each zone represents a resource-constrained, restricted environment within an overarching operating system instance. Each zone appears to an entity, such as a user or administrator, to effectively be an individual instance of the operating system, e.g., Solars™. However, each zone shares common portions of the operating system, such as a kernel and some system binaries at a given patch level, and real time/date. Because each zone can share common operating system binaries, it is difficult to perform a minimization process on a zone-by-zone basis because a binary file to be minimized in one zone may be required by another zone. For example, consider that a Zone A requires telnet capability. Files associated with the telnet capability are visible not only to Zone A, but to all other zones. However, in one embodiment, this issue can be resolved by configuring the system to not share files between zones. In this embodiment, each zone will have its own copy of all files it needs to run, including those files that may have been otherwise shared between zones.

The present invention provides for minimization of a zone-based system by exploiting the fact that each file access request initiated within a zone includes an identifier of the initiating zone. Referring back to the method of FIG. 5, if the interposer is configured to examine not only the target file of the file access call, but also the zone identifier of the file access call, it is possible to distinguish between file access calls from different zones. Thus, it is possible to implement minimization on a per zone basis. For example, Zone A can be allowed to access files related to telnet and Zone B can be denied access to files related to telnet.

Figure 6:
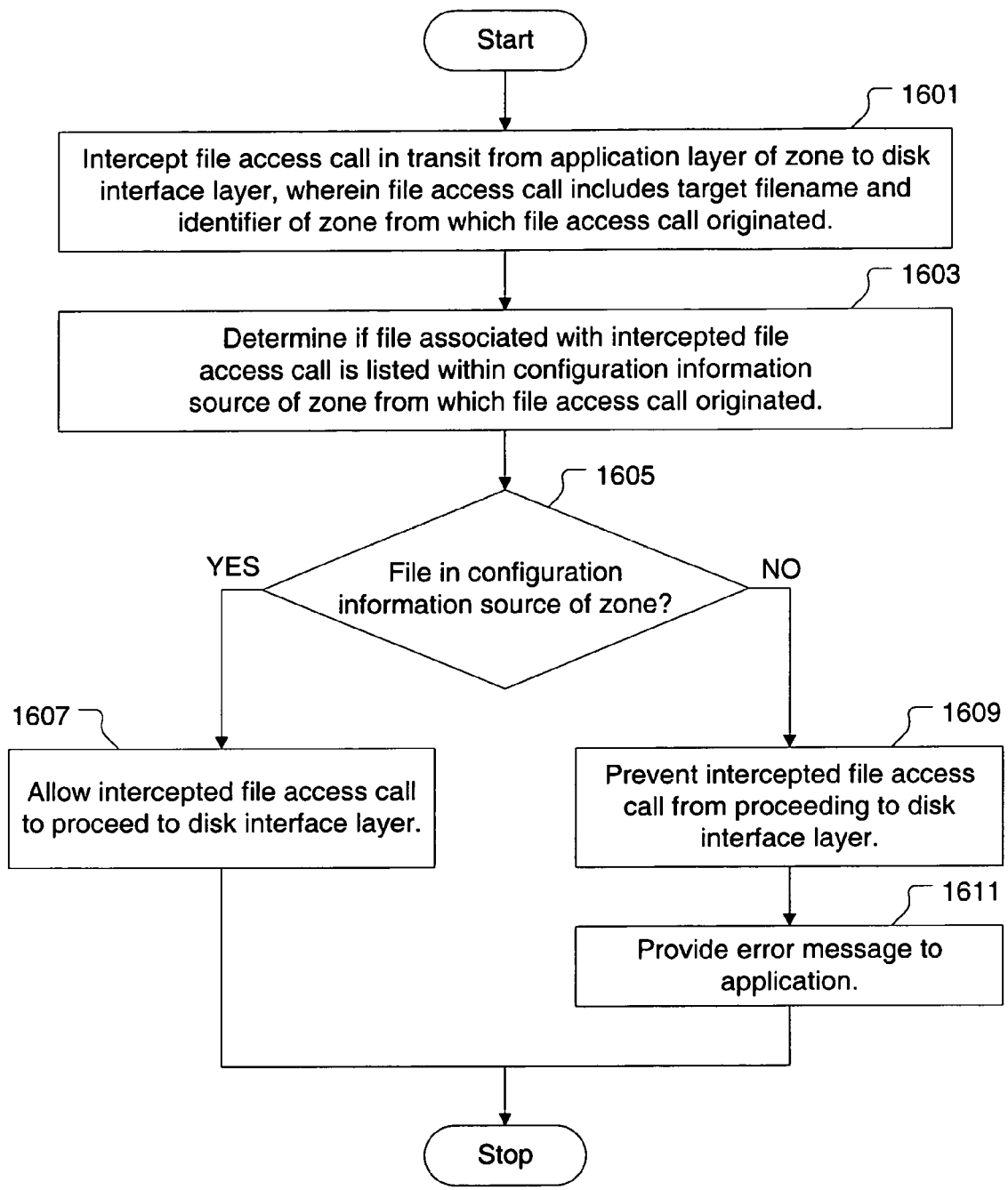
FIG. 6 is an illustration showing a flowchart of a method for implementing minimization within a zone-aware minimized computer system, in accordance with one embodiment of the present invention.

FIG. 6 is an illustration showing a flowchart of a method for implementing minimization within a zone-aware minimized computer system, in accordance with one embodiment of the present invention. As with FIG. 5, it should be appreciated that the minimized computer system referenced in conjunction with FIG. 6 can be either label-aware or non-label-aware. The method of FIG. 6 includes an operation 1601 for intercepting a file access call in transit from an application layer of the computer system to a disk interface layer of the computer system. This intercepted file access call includes both a target filename and an identifier of the zone from which the file access call originated. An operation 1603 is then provided for determining if a file associated with the file access call intercepted in the operation 1601 is listed within a configuration information source of the zone from which the file access call originated. The configuration information source of the zone from which the file access call originated represents the minimized state of the particular zone. According to an operation 1605, if the file associated with the intercepted file access call is present in the configuration information source of the minimized zone, the method continues with an operation 1607 in which the file access call is allowed to proceed to the disk interface layer for further processing. However, if the file associated with the intercepted file access call is not present in the configuration information source of the minimized zone, the method continues from the operation 1605 to an operation 1609. In the operation 1609, the intercepted file access call is prevented from proceeding to the disk interface layer for further processing. Following the operation 1609, the method further includes an operation 1611 for providing an error message to the application from which the intercepted file access call originated. In one embodiment, the error message provided in the operation 1611 simply informs the application that the requested file is not found.

Since zones cannot load or unload kernel modules, or apply patches to system binaries unless they are accessed in a non-shared mode, loading of the interposer and the associated minimization strategy is implemented at a global zone level. For a filesystem with components in both kernel and user spaces, minimization will always be enforced within a particular zone even when the particular zone is in effectively a maintenance mode. Also, because the interposer may only get loaded in the global zone at a multi-user runlevel, rebooting of the system to a maintenance mode renders the entire system visible and accessible for patching and maintenance. When patching and maintenance is completed, the system can be rebooted into the multi-user mode to reinstate the previous minimization strategy. Alternatively, the interposer may be unloaded by a suitably privileged user who is able to provide appropriate authentication to the interposer. Further, the "file hiding" functionality of the interposer may be bypassed by a user who has an appropriate privilege assigned to them.

In accordance with the foregoing, the present invention provides an environment for maintenance and patching wherein it is possible to quickly reverse the effect of minimization on the system at large, or to suspend the effect for individual users or system maintenance processes, and thereby make the entirety of the installed operating environment visible for patching, maintenance, diagnostics, etc. It should be appreciated that the present invention as described with respect to FIGS. 5-6 does not simply use the interposer to intercept and replace system calls for the purpose of concealing files from administrative access, wherein the files are identified and concealed based on their name. For example, the present invention does not rely on existence of a substring within the filename in order for the corresponding file to be identified and concealed. Rather, the minimization method of the present invention references a configuration information source such as a file, a directory entry, or some other appropriate entity, to determine whether files, packages, or directories are intended to be minimized from the system. Furthermore, the minimization method of the present invention provides for structured minimization on a zone-by-zone basis. Additionally, the minimization mechanism provided by the present invention can be made non-unloadable unless proper authentication is provided, e.g., a password specific to the interposer.

Thus far, the minimization methods of the present invention have been geared toward minimization of a previously built system having extraneous components/services beyond the desired minimization profile. In addition to the foregoing, the present invention provides a method for minimization wherein the minimized process is performed in a heuristic manner by starting with a minimal system installation and adding components as required.

Figure 7:
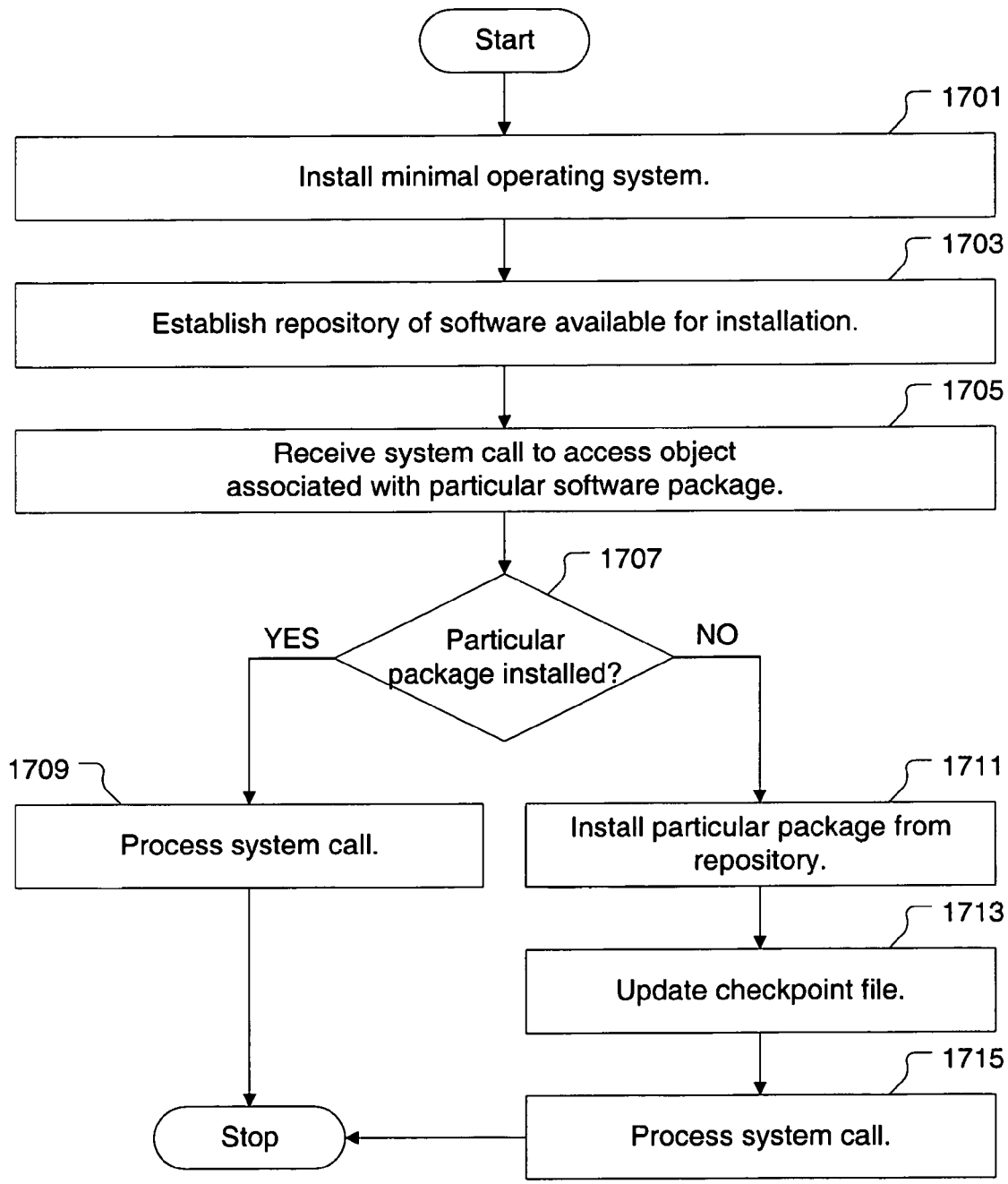
FIG. 7 is an illustration showing a flowchart of a method for heuristically implementing minimization of a computer system, in accordance with one embodiment of the present invention.

FIG. 7 is an illustration showing a flowchart of a method for heuristically implementing minimization of a computer system, in accordance with one embodiment of the present invention. The method includes an operation 1701 in which a minimal operating system installation is performed. In an operation 1703, a repository of software available for installation is established on the computer system. The repository of software is maintained in a non-visible state on the computer system. An operation 1705 is provided for receiving a system call to access a file in a particular software package. In an operation 1707, a determination is made as to whether the particular software package associated with the file is installed on the system. If the particular software package is installed and visible on the system, the system call is processed as indicated by an operation 1709. However, if the particular software package is not installed and visible on the system, the particular package is installed from the repository of software available for installation, as indicated by an operation 1711. Following the operation 1711, the method continues with an operation 1713 in which a checkpoint file is updated. The checkpoint file serves to maintain a history of changes made to the system as each software package is installed. Therefore, in the event that a software package needs to be uninstalled, the checkpoint file can be used to provide information as to what changes need to be reversed in order to uninstall the software package. Then, in an operation 1715, the system call is processed.

Figure 8:
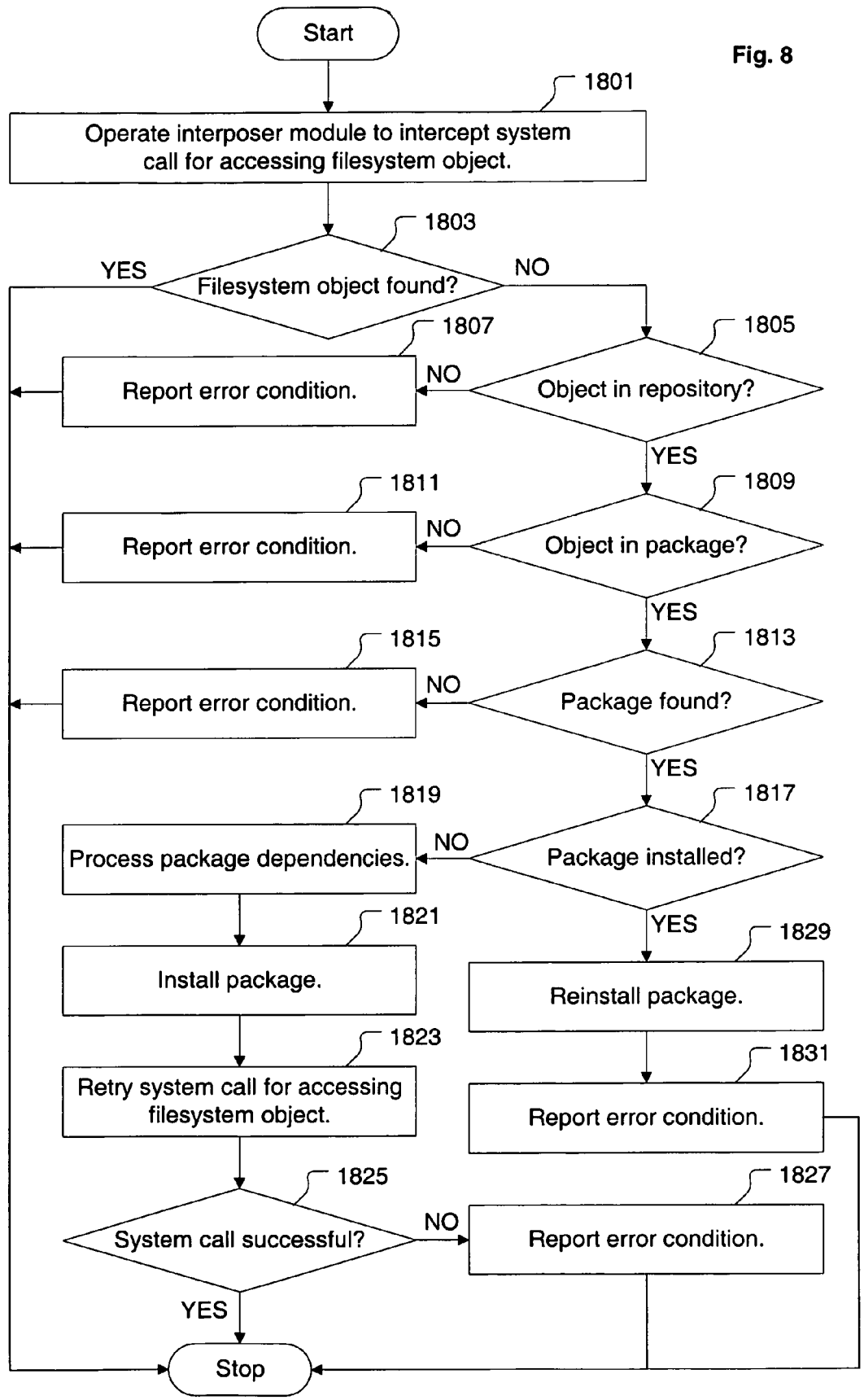
FIG. 8 is an illustration showing a flowchart of a method for training a computer system to achieve a minimized state appropriate for the system's intended purpose, in accordance with one embodiment of the present invention.

FIG. 8 is an illustration showing a flowchart of a method for training a computer system to achieve a minimized state appropriate for the system's intended purpose, in accordance with one embodiment of the present invention. The method of FIG. 8 begins with a computer system having a minimally installed operating system. The computer system also includes a data repository, e.g., directory or container, wherein an entirety of available software is stored in a restricted access state. As the training method of FIG. 8 is performed, the computer system will install and run software as necessary to support requests of entities operating on the system, i.e., users, applications, etc. Additionally, dependencies and requirements of the applications to be installed by the method will be understood. Thus, as applications are required, the method serves to build the minimized system by installing the particular applications, if not already installed. Over time, the system will maintain a minimized state, wherein applications installed on the system will have been previously required.

As previously mentioned, the method requires disk allocation for a repository of software that is available for installation on the system. Therefore, for software that is operating on the system and has been made to operate by the minimization mechanism, one copy of the software is installed on the system and another copy of the uninstalled software exists in the repository. For software that is not yet running on the system, one copy of the uninstalled software exists in the repository. Note that the repository can exist on a shared media source, e.g., Storage Area Network, Network File System share, etc., and is not required to be co-located with the system as long as the software contained in the repository can be accessed by the minimized system.

In an operation 1801, a module, similar to the interposer previously discussed, is operated to intercept each system call for accessing a file system object ("object" for discussion purposes). In an operation 1803, a determination is made as to whether the intercepted file system call is directed to an object already installed on the system. In various embodiments, the object can be an individual file, a configuration of elements, or an amalgamation of files, such as an amalgamation of files managed by a software package. If the object is already installed on the system, the system call is processed and the method concludes. However, if the object is not already installed on the system, the method proceeds with an operation 1805 for determining whether the object exists in the repository. If the object does not exist in the repository, an operation 1807 is performed to report an error condition, e.g., file not found, and the method concludes. If the object is present in the repository, the method continues with an operation 1809. In the operation 1809, a determination is made as to whether the object resides within a software package. If the object is not part of a software package, an operation 1811 is performed to report a corresponding error condition. If the object is part of a software package, the method includes an operation 1813 for determining if the software package is present on the system. If the software package is not present on the system, an operation 1815 is performed to issue an appropriate error message. If the software package is present on the system, an operation 1817 is performed to determine whether the package is presently installed on the system.

If the software package is already installed on the system, the object should have been located on the system in the operation 1803. Therefore, the method proceeds with operations 1829 and 1831 to reinstall the software package and report a corresponding error condition. The software package reinstallation and error condition reporting of operations 1829 and 1831 are configurable. For example, in one embodiment the software package is reinstalled and an error condition is reported. In another embodiment, the software package is reinstalled and an error condition is not reported. In yet another embodiment, the software package is not installed and an error condition is reported.

Referring back to the operation 1817, if it is determined that the software package is not installed, the method proceeds with an operation 1819 for processing dependencies of the software package in preparation for installation of the software package. For example, if software package A relies on software package B, and software package B relies on software package C, it is necessary to ensure that each of software packages A, B, and C are installed to complete the installation of software package A. Following resolution of software package dependencies, the method continues with an operation 1821 for installing the required software packages. Once installation of the required software package is completed, an operation 1823 is performed to retry the system call previously intercepted in the operation 1801. If the retried system call is successful, the method concludes. However, if the retried system call is not successful, a failure condition exists and an appropriate error message is reported. Note that a process or service may be put into a suspended state while the installation of additional software packages (and their dependencies) is completed. The service will be resumed once the necessary software has been installed.

As changes are made to the system according to the method of FIG. 8, a checkpoint file is maintained. The checkpoint file maintains a history of changes made to the computer system as each software package is installed. Therefore, in the event that a package needs to be uninstalled, the checkpoint file can be used to provide information as to what changes need to be reversed in order to uninstall the package. It should be appreciated that the method of FIG. 8 can be used to obtain a list of software package dependencies for use in other aspects of system maintenance.

Once the computer system is sufficiently trained per the method of FIG. 8, the system can be switched from a training mode of operation to a normal mode of operation. In the normal mode of operation, there are no changes made to the system with respect to software installation/uninstallation. Switching between training mode and operational mode is an administrative decision. For example, if new software is to be installed, the administrator may choose to switch into training mode. However, if the system is not expected to change, the administrator can operate the system in normal operation mode.

It should be appreciated that the method of FIG. 8 can be applied to a number of entities, including but not limited to users, groups, and applications. Also, the minimization provided by the method of FIG. 8 is supported at a software package level. The method of FIG. 8 is not reliant on package developers to declare dependencies and requirements. It should be appreciated that a package is installed at a point where continued execution of an already-installed piece of software requires the package.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Embodiments of the present invention can be processed on a single computer, or using multiple computers or computer components which are interconnected. A computer, as used herein, shall include a standalone computer system having its own processor, its own memory, and its own storage, or a distributed computer system, which provides computer resources to a networked terminal. In some distributed computer systems, users of a computer system may actually be accessing component parts that are shared among a number of users. The users can therefore access a virtual computer over a network, which will appear to the user as a single computer customized for their purpose.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for applying minimization to a label-aware computer system, comprising:

creating a minimization compartment on the computer system, wherein the minimization compartment has an associated minimization label, wherein the minimization compartment is a container for entities that share a relationship of having a minimized state within the computer system as indicated by the minimization label, and wherein each entity within the minimization compartment is retained on the computer system and is only visible to and accessible by another entity having clearance to the minimization label;

obtaining a unified security profile, the unified security profile providing a complete listing of software packages required to be installed on the computer system;

identifying extraneous files on the computer system that are not associated with at least one software package listed within the unified security profile;

rewriting a label of each identified extraneous file to the minimization label, the rewriting causing each file having the minimization label to be included in the minimization compartment; and removing reference to each identified extraneous file from a package manifest of the computer system, wherein the package manifest of the computer system provides a listing of packages and files installed on the computer system.

2. The method of claim 1, further comprising:

creating a record of a default state of the computer system, wherein all files present on the computer system are visible in the default state, the record including a listing of files present on the computer system along with an original label assigned to each file present on the computer system.

3. The method of claim 1, further comprising:

stopping extraneous services from operating on the computer system, wherein the extraneous services are not associated with at least one software package listed within the unified security profile.

4. The method of claim 1, wherein the minimization label corresponds to a highest configurable level of security clearance or a compartment disjoint from user-accessible compartments provided by an operating system of the computer system.

5. The method of claim 1, further comprising:
   reversing minimization of a particular software package, wherein the particular software package has its associated files included in the minimization compartment, the reversing including,
      identifying files in the minimization compartment that are associated with the particular software package,
      rewriting a label of each file associated with the particular software package to its original label,
      adding a name of each file associated with the particular software package to the package manifest of the computer system.

6. The method of claim 1, wherein the minimization compartment is disjoint from all other containers defined on the computer system.

7. A label-aware computer system including one or more computer readable storage media, comprising:
   a minimization compartment defined within one or more of the computer readable storage media and having an associated minimization label, wherein the minimization compartment is a container for entities that share a relationship of having a minimized state within the computer system as indicated by the minimization label, and wherein each entity within the minimization compartment is retained on the computer system and is only visible to and accessible by another entity having clearance to the minimization label;
   a unified security profile defined within one or more of the computer readable storage media for providing a complete listing of software packages required to be installed on the computer system;
   computer-executable program instructions defined within one or more of the computer readable storage media for identifying extraneous files on the computer system that are not associated with at least one software package listed within the unified security profile;
   computer-executable program instructions defined within one or more of the computer readable storage media for rewriting a label of each identified extraneous file to the minimization label, the rewriting causing each file having the minimization label to be included in the minimization compartment;
   a package manifest defined within one or more of the computer readable storage media to provide a listing of packages and files installed on the computer system; and
   computer-executable program instructions defined within one or more of the computer readable storage media for removing reference to each identified extraneous file from the package manifest.

8. The label-aware computer system of claim 7, further comprising:
   a record of a default state of the computer system defined within one or more of the computer readable storage media, wherein all files present on the computer system are visible in the default state, the record including a listing of files present on the computer system along with an original label assigned to each file present on the computer system.

9. The label-aware computer system of claim 7, further comprising:
   computer-executable program instructions defined within one or more of the computer readable storage media for stopping extraneous services from operating on the computer system, wherein the extraneous services are not associated with at least one software package listed within the unified security profile.

10. The label-aware computer system of claim 7, wherein the minimization label corresponds to a highest configurable level of security clearance or a compartment disjoint from user-accessible compartments provided by an operating system of the computer system.

11. The label-aware computer system of claim 7, further comprising:
    computer-executable program instructions defined within one or more of the computer readable storage media for reversing minimization of a particular software package, wherein the particular software package has its associated files included in the minimization compartment, the reversing including,
    identifying files in the minimization compartment that are associated with the particular software package,
    rewriting a label of each file associated with the particular software package to its original label,
    adding a name of each file associated with the particular software package to the package manifest of the computer system.

12. The label-aware computer system of claim 7, wherein the minimization compartment is disjoint from all other containers defined on the computer system.

* * * * *